US012586487B2

(12) United States Patent
Hess et al.

(10) Patent No.: US 12,586,487 B2
(45) Date of Patent: Mar. 24, 2026

(54) LIT BADGE WITH ROLL STAMP SELECTIVE CHROMING

(71) Applicant: Magna Exteriors Inc., Aurora (CA)

(72) Inventors: Mark Hess, Gaines, MI (US); Bradley Cox, Clifford, MI (US); Dan Clarry, Markham (CA); Gregory P. Milligan, Concord (CA); Andre Rest, Richmond Hill (CA)

(73) Assignee: Magna Exteriors Inc., Aurora (CA)

( * ) Notice: Subject to any disclaimer, the term of this patent is extended or adjusted under 35 U.S.C. 154(b) by 236 days.

(21) Appl. No.: 18/332,258

(22) Filed: Jun. 9, 2023

(65) Prior Publication Data

US 2023/0410697 A1 Dec. 21, 2023

Related U.S. Application Data

(60) Provisional application No. 63/351,135, filed on Jun. 10, 2022.

(51) Int. Cl.
| | |
|---|---|
| *G09F 13/04* | (2006.01) |
| *B29C 45/16* | (2006.01) |
| *B60R 13/00* | (2006.01) |
| *C25D 7/00* | (2006.01) |
| *G09F 13/08* | (2006.01) |
| *G09F 21/04* | (2006.01) |
| *B29L 31/30* | (2006.01) |

(52) U.S. Cl.
CPC ...... *G09F 13/0404* (2013.01); *B29C 45/1679* (2013.01); *B60R 13/005* (2013.01); *C25D 7/00* (2013.01); *G09F 13/08* (2013.01); *G09F*

*21/048* (2013.01); *B29K 2995/0026* (2013.01); *B29L 2031/3005* (2013.01)

(58) Field of Classification Search
CPC .... G09F 13/0404; G09F 13/08; G09F 21/048; B60R 13/005
See application file for complete search history.

(56) References Cited

U.S. PATENT DOCUMENTS

| | | | | |
|---|---|---|---|---|
| 4,977,695 | A * | 12/1990 | Armbruster | B60R 13/005 |
| | | | | 40/556 |
| 9,834,136 | B2 * | 12/2017 | Roberts | G09F 21/04 |
| 2012/0182722 | A1 * | 7/2012 | Wu | F21S 43/26 |
| | | | | 362/157 |
| 2015/0239390 | A1 * | 8/2015 | Oliverio | B60R 13/005 |
| | | | | 340/461 |
| 2016/0107585 | A1 * | 4/2016 | Sugiura | B60R 13/005 |
| | | | | 296/1.08 |
| 2016/0201874 | A1 * | 7/2016 | Stemmer | F21V 3/10 |
| | | | | 362/555 |
| 2016/0221497 | A1 * | 8/2016 | Schindler | B60Q 1/56 |
| 2017/0101047 | A1 * | 4/2017 | Dellock | F21K 9/64 |
| 2019/0001878 | A1 * | 1/2019 | Schneider | G09F 21/049 |
| 2019/0031090 | A1 * | 1/2019 | Stossel | B60Q 3/64 |
| 2019/0031118 | A1 * | 1/2019 | Sanahuja Clot | B60R 19/52 |

(Continued)

*Primary Examiner* — Gary C Hoge

(57) ABSTRACT

There is provided a badge adapted for a vehicle that includes a first portion formed from a first injection molded process of light transmissive material and a second portion formed from a second injection molded process of plateable material. The plateable portion provides a chrome exterior of trim. The first portion provides a light-through decoration where the light transmissive material is back lit with at least one lighting element.

17 Claims, 3 Drawing Sheets

(56) References Cited

U.S. PATENT DOCUMENTS

| 2019/0337446 A1* | 11/2019 | Salter ..................... F21S 41/50 |
| 2023/0097994 A1* | 3/2023 | Hirotani ............... B60R 13/005 |
| | | 219/202 |
| 2023/0118635 A1* | 4/2023 | Nakano ................. H05B 3/286 |
| | | 296/1.08 |
| 2023/0250941 A1* | 8/2023 | Arai ..................... G09F 21/048 |
| | | 362/546 |
| 2024/0280252 A1* | 8/2024 | Bryant ..................... G09F 3/18 |

* cited by examiner

LIT BADGE WITH ROLL STAMP SELECTIVE CHROMING

CROSS-REFERENCE TO RELATED APPLICATIONS

This application is a non-provisional patent application and claims benefit of U.S. Provisional Patent Application No. 63/351,135, filed Jun. 10, 2022. The disclosure of the above application is incorporated herein by reference.

FIELD OF THE INVENTION

The present invention relates to a backlit emblem adapted for a vehicle, and method for manufacturing same incorporating roll stamp selective chroming.

BACKGROUND OF THE INVENTION

Known components with chrome have issues with delaminating and flaking of the chrome/paint and the processes known for making the components are also time consuming, labor intensive, and often results in a higher component piece price. Typical chrome parts, such as vehicle brand badges, are known to have warranty issues stemming from delaminating and/or flaking paint on paint-over chrome vehicle badges, which is aesthetically displeasing and expensive to replace. One disadvantageous manufacturing process chromes all of the molded parts, e.g., chromes the entire vehicle badge, then masks the parts before painting only portions of the vehicle badge, e.g., such as painting only the letters. This results in increased manufacturing costs, labor, and time, and warranty issues. In one known attempt to remedy the aforementioned issues, a snap together design for a vehicle badge was employed with no painting, however, multiple parts with assembly are required. Such a design is more expensive and manufacturing of the snap together component is slow and expensive.

Known components also do not allow incorporating of backlit lighting elements and light transmissive material.

Accordingly, a process is desired which is operable for molding a final assembly that incorporates light-transmissive material and reduces areas of wasted chrome material, while improving manufacturing cost and time, and allowing predetermined hidden aspects until lit through.

SUMMARY OF THE INVENTION

Hidden until lit through trim pieces utilizing the selective chrome process. There is provided a badge adapted for a vehicle that includes a first portion formed from a first injection molded process of light transmissive material and a second portion formed from a second injection molded process of plateable material. The plateable portion provides a chrome exterior of trim. The second portion provides a light-through decoration where the light transmissive material is back lit with at least one lighting element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
FIG. 1 is a front elevation view of a badge assembly, in accordance with the present invention.
Figure 2:
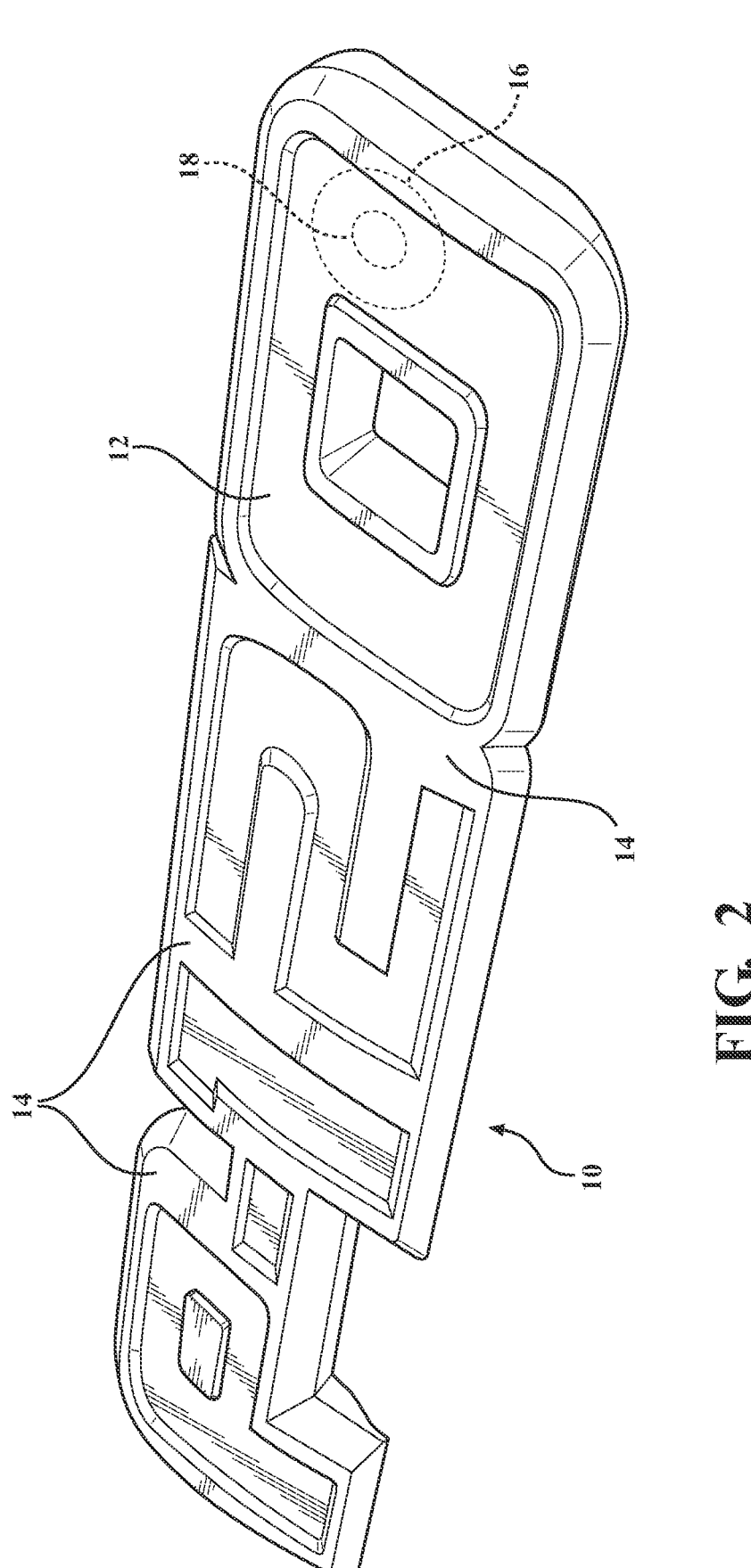
FIG. 2 is a perspective view of the badge assembly, in accordance with the present invention.
Figure 3:
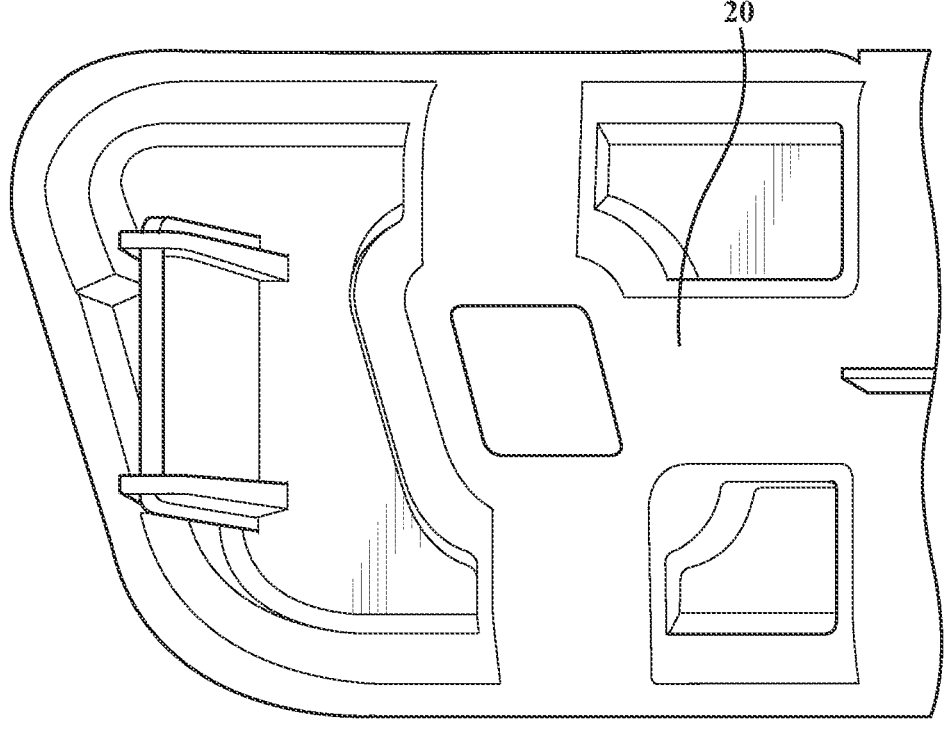
FIG. 3 is a rear elevation view of the badge assembly broken along its length, in accordance with aspects of the present invention.

Referring to FIGS. 1-3 generally, there is provided a backlit badge assembly, shown generally at 10, comprising at least one predetermined first portion 12 of non-plateable material, at least one second predetermined portion 14 of plateable material, and at least one lighting device, indicated generally at 16. The non-plateable material is most preferably light transmissive material.

Chrome is operably deposited, or its flow directed onto the plateable material portion 14. Chrome does not deposit on the non-plateable portion.

An injection molding assembly is provided. Preferably, a first injection molded shot consists of predetermined light transmissive material for forming the first part 12. The light transmissive material is not plateable. Preferably, a second injection molded shot consists of a plateable material for forming the second part 14. The plateable material is at least one predetermined material, such as chrome.

According to aspects of the present invention, the first part 12 can operably blend in with the second portion 14 or is adapted to operably be hidden until backlit through this decorative first part 12 portion.

Preferably, the at least one predetermined second portion 14 of plateable material is substantially an exterior trim of the badge (or emblem, such as emblem/badge adapted to operably attach to a vehicle, e.g., with at least one fastener, snap-fit mechanical arrangement, etc.). Once plated, the badge then has a chrome exterior trim. It is understood that any at least one predetermined plated portion locations, shape, and dimensions are contemplated depending on the application without departure from the scope of the present invention.

At least one lighting device 16 is provided adapted to operably couple to at least one predetermined location of the assembly 10. The at least one lighting device 16 includes at least one lighting source 18, e.g., light emitting diode(s) of the same or different color, rope LEDs, LEDs on circuit board, etc. The light transmissive material in the at least one first portion 12 is selectively backlit with one or more light source 18 in one or more colors. By way of non-limiting example, a plurality of interior segments of the badge are formed of the light transmissive material, and the exterior trim is the plateable material that is chromed, e.g., trim or lip of the badge and trim surrounding each light transmissive portion/design, e.g., about numbers "1", "2", "O", and letter "P", for non-limiting illustrative purposes). In accordance with aspects of the present invention, the at least one lighting source 18 is operably embedded in predetermined injected material in at least one predetermined location. According to aspects of the present invention, the at least one lighting source 18 is operably connected to the assembly, e.g., with at least one fastener, adhesive, welded, IR welded, and any combinations thereof, in at least one predetermined location.

According to aspects of the present invention, at least one predetermined pathway 20 on the part is/are provided for directly chroming material as electric current is operably supplied for plating. By way of example, the assembly 10 is operably selectively coupled to travel along a predetermined chroming process line where chrome is operably supplied as a predetermined electric current for a predetermined time is applied (e.g., via at least one predetermined part tab or other feature) for selective chroming.

It is understood that the badge 10 and plateable and non-plateable shapes are operably adaptable for any predetermined arrangement depending on the particular applications without departure from the scope of the present invention.

It is understood that the second portion 14 could additionally or alternatively be a light transmissive material, and the first portion 12 could be a plateable material.

According to aspects of the present invention, a final injection molded assembly 10 is provided having one or more injection molded parts made of non-plateable material, one or more injection molded parts, 12, 14, etc., made of plateable material, and at least one pathway 20 and incorporated features to direct flow path of chrome material to specific areas, and process for making same. The final injection molded assembly 10, e.g., badge assembly, is manufactured using multiple shot injection molding for processing multiple parts of various materials in a single mold. There is depicted an assembly for a motor vehicle configured to reduce wasted chrome while directing chrome to areas that need chrome and allowing backlighting through light transmissive non-platable material, in accordance with the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A badge assembly adapted for a motor vehicle, comprising:
   at least one first injection molded portion formed of a light transmissive material;
   at least one second injection molded portion formed of a plateable material, said second injection moldable part comprising a plurality of paths on a back of said badge assembly that directs a flow path of chrome material when a predetermined electric current is applied; and
   at least one lighting device.

2. The badge assembly of claim 1, wherein said chrome material is operably provided on said plateable material operably adapted to provide a chrome exterior of trim.

3. The badge assembly of claim 1, further comprising providing at least one predetermined plating material path on to said plateable material operably adapted to deliver said chrome material over said plateable material.

4. The badge assembly of claim 1, wherein the first injection molded portion provides a light-through decoration where the light transmissive material is back lit with the at least one lighting device.

5. The badge assembly of claim 1, wherein said at least one first injection molded portion is operably adapted to allow light transmission back light via said at least one lighting device.

6. The badge assembly of claim 1, wherein said at least one lighting device is operably coupled adjacent to said at least one first injection molded portion to operably selectively provide said badge assembly with backlight.

7. The badge assembly of claim 1, wherein said at least one lighting device is operably embedded in said first and/or second injection molded portion and operably adapted to selectively illuminate said light transmissive material.

8. The badge assembly of claim 1, wherein said at least one lighting device is operably coupled to said badge assembly operable to selectively transmit light from behind to illuminate said light transmissive material.

9. The badge assembly of claim 1, wherein said at least one lighting device operably transmits light from behind said badge assembly to provide a predetermined illumination design visible at a front of said first injection molded portion via said light transmissive material.

10. The badge assembly of claim 1, wherein said at least one lighting device is operably welded to said badge assembly.

11. The badge assembly of claim 1, wherein said at least one lighting device comprises a plurality of light emitting diodes operable to selectively emit predetermined different colors operably adapted to selectively backlight said light transmissive material.

12. The badge assembly of claim 1, wherein said at least one lighting device comprises a plurality of light emitting diodes operable to emit a predetermined same color to selectively backlight said light transmissive material.

13. The badge assembly of claim 1, further comprising at least two mounting features integrally formed on a backside of said badge assembly and each including an attachment feature forming a clip for attachment to said motor vehicle.

14. The badge assembly of claim 13, wherein the at least one first injection molded portion is partially overmolded by the at least one second injection molded portion.

15. The badge assembly of claim 14, further comprising at least one opening through said at least one first injection molded portion, wherein said at least one second injection molded portion includes at least one other opening aligned with said at least one opening and said at least one second injection molded part forming a lip around an exterior of said at least one opening of said at least one first injection molded portion providing at least one show surface of said badge assembly.

16. The badge assembly of claim 15, wherein said at least one second molded part provides a perimeter show surface of said badge assembly.

17. The badge assembly of claim 16, wherein said at least one second injection molded part forms a pathway through said at least one opening and provides a surface path comprised of said plurality of paths on said back of said badge assembly that are coupled to the perimeter of said second injection molded part, said plurality of paths directs the flow path of chrome material to said show surface of said injection molded assembly and said perimeter show surface when a predetermined electric current is applied, wherein said show surface and perimeter show surface are plated with said chrome material.

\* \* \* \* \*